US005676593A

United States Patent [19]

Stevens

[11] Patent Number: 5,676,593

[45] Date of Patent: Oct. 14, 1997

[54] CUTTER FOR SOFT MATERIALS AND METHOD FOR MAKING IT

[76] Inventor: Richard B. Stevens, 90 Clovelly Rd., Stamford, Conn. 06902

[21] Appl. No.: 512,371

[22] Filed: Aug. 8, 1995

[51] Int. Cl.[6] .............................. B23F 21/03; B21K 5/04

[52] U.S. Cl. .............................. 451/540; 433/165; 30/164.9; 76/108.2; 76/DIG. 12; 408/145

[58] Field of Search .............................. 433/165, 166; 451/56, 541, 547, 523, 524, 544, 557, 540; 125/11.03; 30/164.9; 408/144, 145; 76/108.1, 108.2, 108.4, DIG. 12

[56] References Cited

U.S. PATENT DOCUMENTS

| | | | |
|---|---|---|---|
| 1,915,016 | 6/1933 | Diffenderffer . | |
| 3,082,530 | 3/1963 | Hopf et al. . | |
| 3,309,772 | 3/1967 | Lieb et al. . | |
| 4,290,498 | 9/1981 | Triplett et al. | 175/379 |
| 4,389,192 | 6/1983 | Neuwirth | 433/166 |
| 4,661,064 | 4/1987 | Beltramini . | |
| 4,679,971 | 7/1987 | Maier . | |
| 4,830,615 | 5/1989 | Feinman et al. . | |
| 5,123,217 | 6/1992 | Ishikawa et al. . | |
| 5,137,096 | 8/1992 | Raffaelli . | |
| 5,178,497 | 1/1993 | Kitabayashi et al. | 408/145 |
| 5,190,568 | 3/1993 | Tselesin | 51/293 |

*Primary Examiner*—Edgar S. Burr
*Assistant Examiner*—Dave A. Ghatt
*Attorney, Agent, or Firm*—St. Onge Steward Johnston & Reens

[57] ABSTRACT

A cutter for soft materials is described. The cutter is made from a conventional cutting instrument such as a dental drill bit having hard particles embedded in the tip surface. The cutter is ground at the tip end so as to remove particles which leave cavities around the peripheral flat ground tip end. The open cavities and the sharp edges around them provide an effective cutting edge with which soft materials can be cut in clean even lines.

7 Claims, 2 Drawing Sheets

CUTTER FOR SOFT MATERIALS AND METHOD FOR MAKING IT

FIELD OF THE INVENTION

This invention relates to cutters and more particularly to a method and device for curing objects such as the carving of articles.

BACKGROUND OF THE INVENTION

Cutting and polishing bits are well known in the art. Typically, as shown in the Feinman et al, U.S. Pat. No. 4,830,615, a dental cutter is described on which an abrasive coating is placed for curing and polishing. Grooves are formed on a dental rotating tool in U.S. Pat. No. 4,661,064. Various shapes are proposed and different coatings are employed on the same bit or instrument. A cubic polycrystalline diamond or boron nitride material is placed on a rotary curing tool in the Maier U.S. Pat. No. 4,679,071 as well as on the grinding tool described in the Diffenderfer U.S. Pat. No. 1,915,016. Various other diamond coated cutters, drill bits are found in U.S. Pat. Nos. 3,309,772; 3,082,530; 5,123,217; and 5,137,098.

These prior art devices are excellent for curing of hard substances, but tend to be less effective for fine control over the curing or carving of soft materials such as wood. For example, when such a cutter is employed for the carving of fine lines in a bird carving to simulate lines in the feathers, the cutter leaves undesired rough edges and appearances.

It is, therefore, an object of the invention to provide a cutter for soft materials. It is a further object of the invention to provide a cutter with which fine lines in soft materials can be made. It is still further an object of the invention to provide a method for making a cutter for use in working soft materials such as wood and the like.

These and other advantages and objects of the invention can be understood from the following detailed description of the invention of which an embodiment is shown in the drawings.

DETAILED DESCRIPTION OF THE DRAWING

Figure 1:
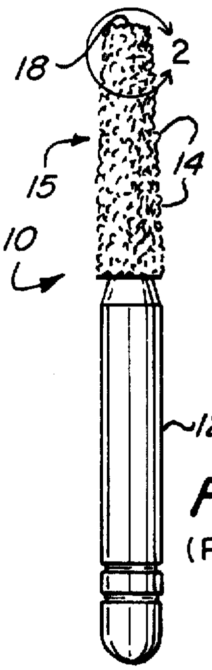
FIG. 1 (PRIOR ART)
FIGS. 1 and 2 are respectively a side and enlarged partial view of a typical dental instrument or cutter as is available in the art.
Figure 2:
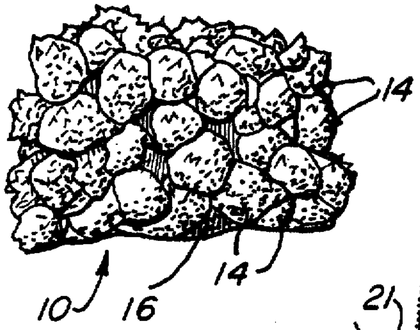
FIG. 2 (PRIOR ART)

With reference to FIGS. 1 and 2 a conventional dental cutter 10 is illustrated as is commonly available. The cutter 10 is formed of a metal base body 12 at least the surface of which is covered by hard particles 14 such as can be made of hardened metal, diamond or carborundum or nonmetal hard particles and the like. The particles 14 are partially embedded in the surface 16 of tip 15 of the metal base 12.

Figure 4:
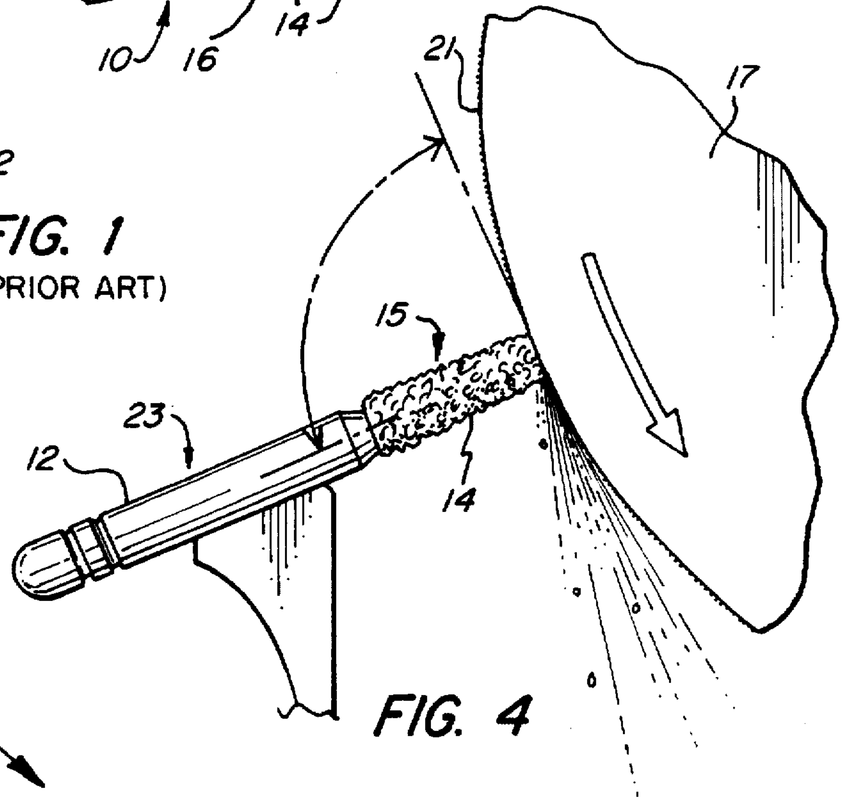
FIG. 4 is a side view in elevation of a an abrading step to form a cutter in accordance with the invention.
Figure 5:
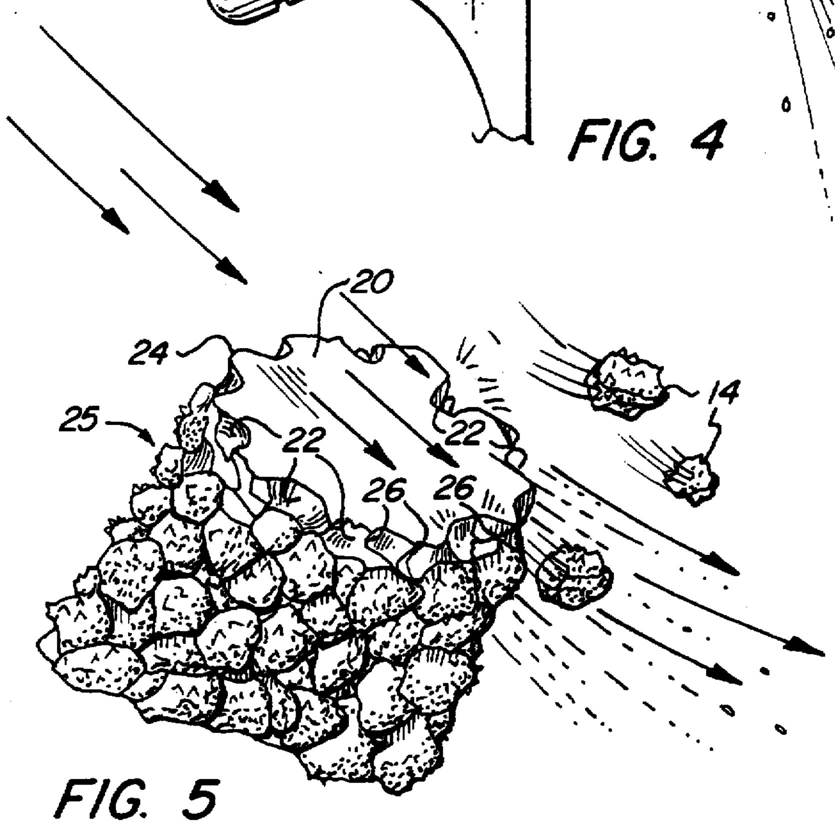
FIG. 5 is a perspective partial view of the effect on the tip of a cutter in accordance with the invention from the abrading step shown in FIG. 3.
Figure 6:
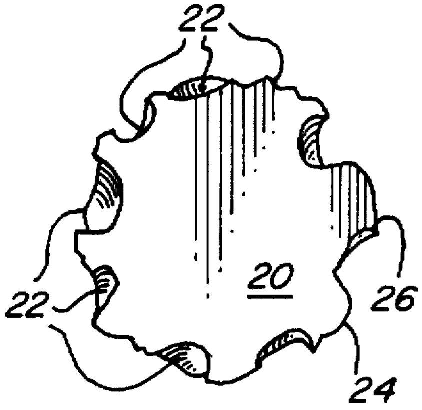
FIG. 6 is an end view of a cutter in accordance with the invention.

The cutter 10 is then applied to a grinding wheel 17 in the manner illustrated in FIG. 4 with the tip end 18 of the cutter 10 substantially perpendicular to the grinding surface 2 of the grinding wheel 17. Different angles could be employed. The main function of the grinding step is a flattening of the tip end 20 as shown in FIG. 5 and in particular a removal of particles 14 from peripheral embedded positions around the tip end 20 to leave cavities 22 in the parent metal 16 as illustrated in the views of FIGS. 5 and 6.

The removal of the particles leave open cavities 22 around the flattened tip end 20 to form a cutter 23 in accordance with the invention. The cutter 23 has a modified tip 25 having a sharp irregular edge 24 formed at the intersections of the cavities 22 with the tip end surface 20. Other irregular edges 26 around the cavities together with edge 24 can then serve to cut a soft material such as wood or plastic.

Figure 3:
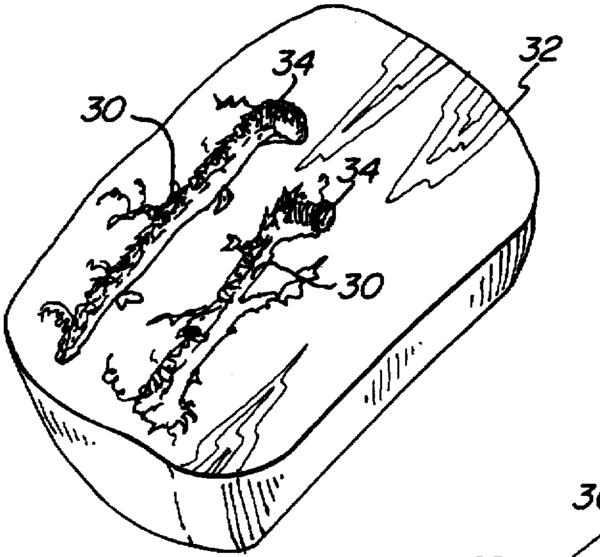
FIG. 3 (PRIOR ART)
FIG. 3 is a perspective view of the effect of using a conventional cutter as illustrated in FIGS. 1 and 2 on a soft material such as wood.

The advantage of a cutter in accordance with the invention can be particularly appreciated from its use in comparison with a conventional cutter. In FIG. 3 the use of a conventional cutter in forming scribe lines 30 on the surface of a piece of wood 32 tend to leave ragged edges such as 34. When a cutter in accordance with the invention is used to form scribe lines, very fine and clean lines such 36 can be formed in a soft material such as the same type of wood 38 without the presence of the ragged appearance shown for the scribe lines 30 in FIG. 3.

Figure 9:
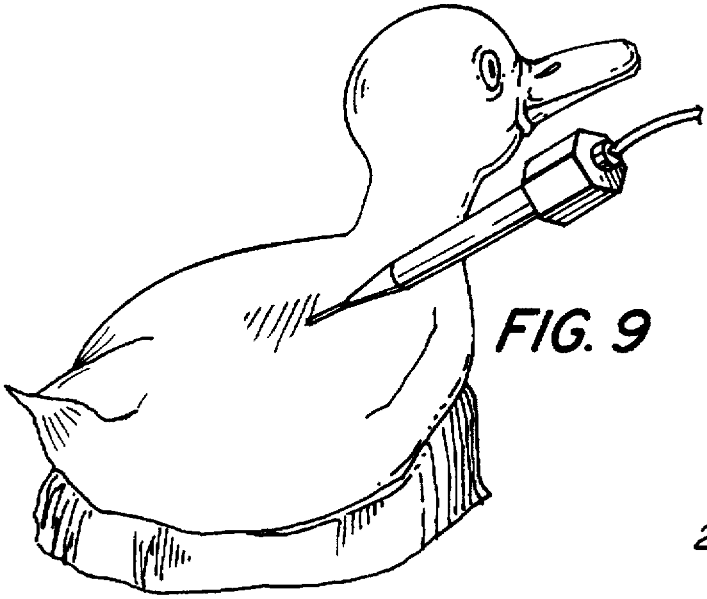
FIG. 9 is a perspective view of the use of a cutter in accordance with the invention in the carving of a wooden duck.
Figure 7:
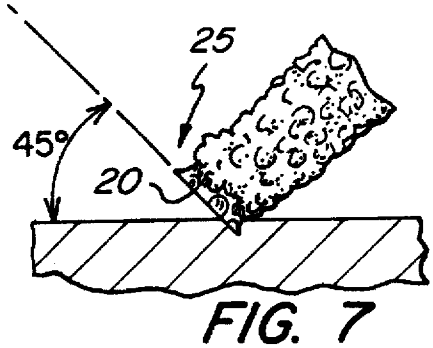
FIG. 7 is an enlarged view in elevation of the tip portion of a cutter in accordance with the invention when it is in use.
Figure 8:
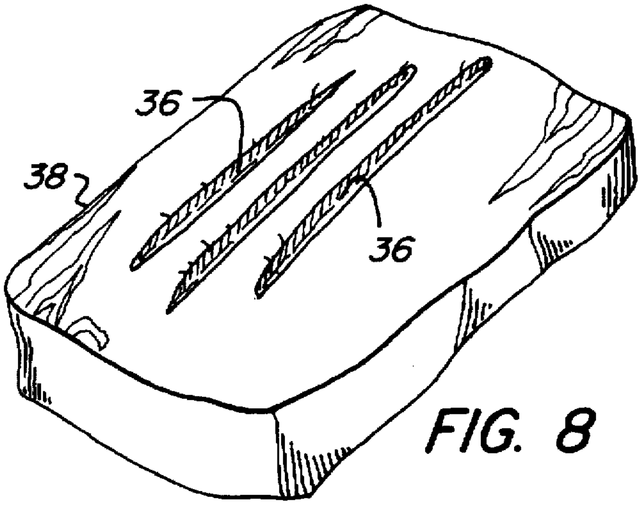
FIG. 8 is a perspective view of the effect of using a cutter in accordance with the invention on a soft material such as wood.

As a result very fine feather lines can be carved in carving a wooden duck 40 as illustrated in FIG. 9. One application of the cutter of this invention may employ the cutter in the manner as illustrated in FIG. 7. A cutter in accordance with the invention can be used for many different materials and in many different application other than for the carving of wooden ducks.

Having thus described a preferred embodiment in accordance with the invention its advantages can be understood. Variations can be made without departing from the scope of the invention as set forth by the following claims.

What is claimed is:

1.A cutter comprising:

an elongate metal stock having a tip end whose surface has embedded hard particles which extend outwardly, said particles being captured within cavities in the metal stock;

a plurality of vacated cavities, formed by the removal of particles from an end of the tip, being aligned along an outer peripheral edge of said tip end; said vacated cavities having sharp edges along said outer peripheral edge of said tip end to form a cutting edge.

2. The cutter as claimed in claim 1 wherein said metal stock has a central axis coaxial with said surface, and wherein said tip end has a substantially flat surface which is oriented substantially transversely to said central axis and intersects vacated irregularly shaped cavities to form said sharp edges for the cutting edge.

3. The cutter as claimed in claim 2 wherein said tip end flat surface is a ground surface.

4. A cutter comprising:

an elongate metal stock having a tip end whose surface has embedded hard particles which extend above the metal tip surface, said particles being captured within the metal stock in irregularly shaped cavities surrounded by walls which terminate at edges;

said metal stock having a substantially flat grounded end surface at said tip end to form a fiat end surface with a peripheral edge from which a plurality of particles have been removed so as to leave a plurality of vacated irregularly shaped cavities intersecting said flat end surface along said peripheral edge with sharp edges to form a correspondingly irregularly shaped cutting edge.

5. The cutter as claimed in claim 4 wherein said metal stock and embedded particles comprises a dental drill bit.

6. A method for forming a cutter comprising the steps of:

providing a metal stock having a peripheral edge and a plurality of hard particles embedded in a tip end surface and grinding said tip end surface until said end surface is flattened and hard particles around the peripheral edge of the end surface have been removed leaving cavities, which intersect both the peripheral edge and the ground end surface.

7. The method as claimed in claim 6 wherein said grinding step comprises holding said metal stock at a substantially right angle against a grinding surface.

* * * * *